UNITED STATES PATENT OFFICE.

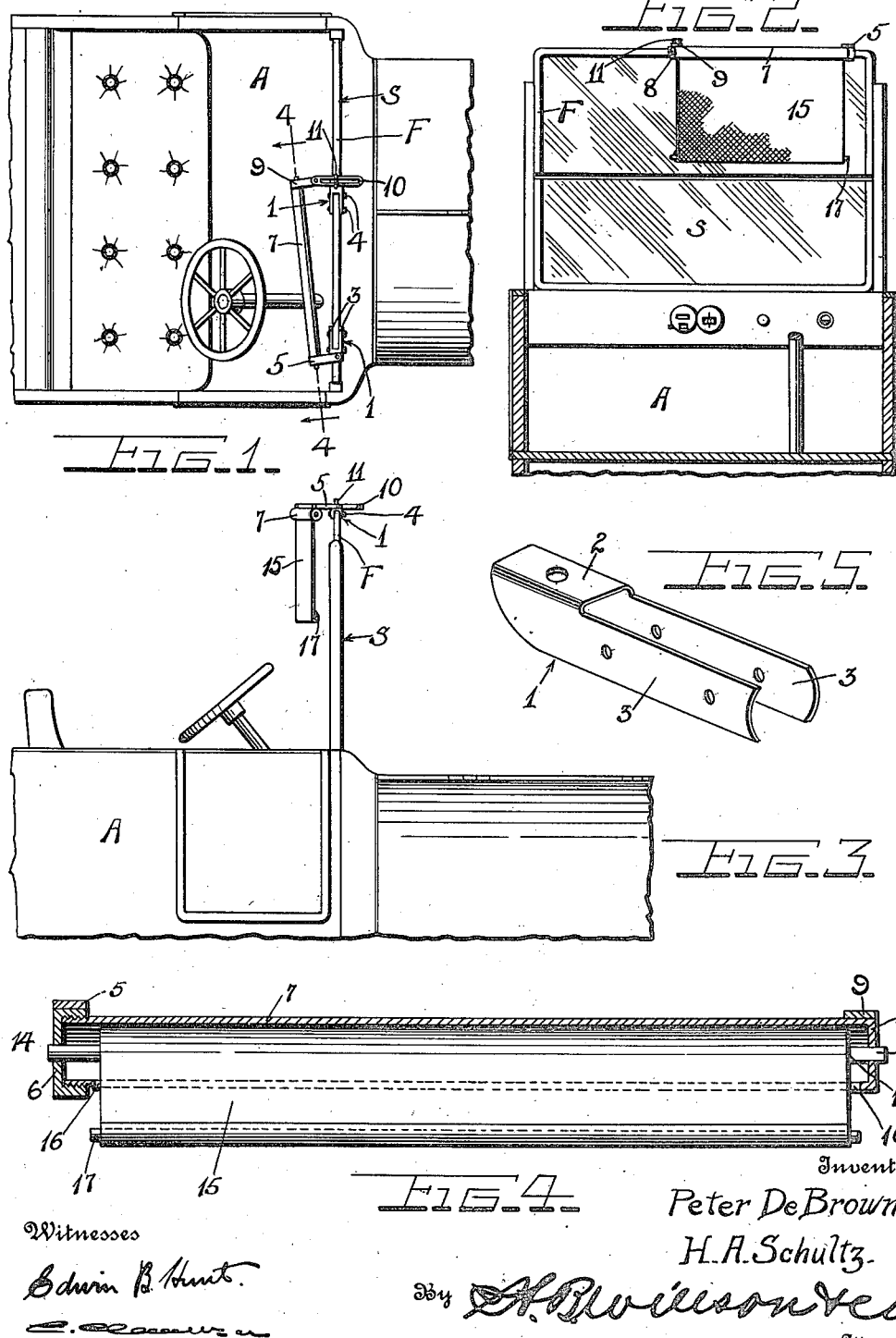

PETER DE BROWN AND HENRY A. SCHULTZ, OF KAWKAWLIN, MICHIGAN.

EYE-SHIELD FOR ATTACHMENT TO AUTOMOBILES.

1,141,763.   Specification of Letters Patent.   Patented June 1, 1915.

Application filed May 28, 1914. Serial No. 841,654.

*To all whom it may concern:*

Be it known that we, PETER DE BROWN and HENRY A. SCHULTZ, citizens of the United States, residing at Kawkawlin, in the county of Bay and State of Michigan, have invented certain new and useful Improvements in Eye-Shields for Attachment to Automobiles; and we do declare the following to be a full, clear, and exact description of the invention, such as will enable others skilled in the art to which it appertains to make and use the same.

Our invention relates to improvements in eye shields for attachment to automobiles.

The primary object of the invention is to provide a device of this character which may be simply constructed and which will effectually guard the eyes of a person, driving an automobile, against direct rays of light, radiating from the headlights of an approaching machine.

In carrying out the above end, we provide a screen, a pair of supporting arms therefor, means whereby one of said arms may be pivotally connected to a wind shield, and means whereby the screen may be swung upon said pivot arm and secured in angular relation to the longitudinal center of the machine, thereby allowing the eyes of the operator to be shielded against rays of light, projected from a passing machine.

A secondary object of the invention is to so mount the screen as to allow the same to readily be projected, when its use is needed, or retracted and housed when not necessary.

With these objects in view, the invention resides in certain novel features of construction and combination herein described and claimed and shown in the drawings wherein:

Figure 1 is a top plan view of a portion of an automobile, showing the application of our invention thereto; Fig. 2 is a transverse section taken in rear of the wind shield and illustrating more particularly the positioning of the screen when in operation; Fig. 3 is a side view of a portion of the machine and the device attached thereto; Fig. 4 is a detail transverse section on the line 4—4 of Fig. 1; and Fig. 5 is a perspective view of one of the attaching clamps.

In the accompanying drawings, we have shown portions of an automobile A which is provided with the usual wind shield S, the latter including a rectangular metallic supporting frame F to the upper transverse bar of which, our invention is attached by means of a pair of clamps 1. Each of said clamps comprises a plate 2 which is connected at its opposite edges, to the upper edges of attaching flanges 3, the latter being curved transversely throughout their lengths and being held in contact with the opposite sides of the upper bar of the frame F, by means of suitable bolts or rivets 4. Pivoted to one of the plates 2, is a rigid arm 5 which projects laterally from the upper portion of an internally threaded cap 6 which forms a closure for one end of a tube 7, the latter being closed at its opposite end by a solid cap 8 from which a second arm 9 rigidly projects, said arms 5 and 9 lying preferably in a horizontal plane. Pivoted, at one end, to the arm 9, is a slotted link 10 which overlies the plate 2 of the remaining clamp and is held in frictional contact therewith by means of a set screw 11 which passes through the slot in said link and is threaded through an opening in said plate. By this construction, it will be seen that the tube 7 may be adjusted to numerous angular relations in respect to the remaining parts of the machine.

Revolubly mounted within the tube 7, is a screen supporting roller 12 which is constructed in a manner similar to the ordinary shade roller and which has its squared stub shaft 13 mounted in the cap plate 8, while its rotating stud 14 is revolubly mounted in a central aperture formed in the cap plate 6. This roller 12 is provided to support a screen or shield 15 which depends through a slot 16 in the under side of said tube and carries a rod 17 on its lower end, said rod being of sufficient weight to retain the screen or shade in proper position when the same is pulled downwardly in a manner to be set forth.

With the parts as above described, the operation of the devices is as follows: The thumb screw 11 is loosened and the tube 7 is adjusted to the position shown in Fig. 1 or to any other appropriate angular relation, after which said screw is again tightened. By this positioning of the tube, it will be seen that rays of light, radiating from the headlights of a passing machine, will be prevented from shining directly into the eyes of the person, operating the machine to which the invention is attached, when the screen 15 is pulled downwardly as shown in Fig. 2. When in this position, the screen also shields the eyes of the operator against lights directly ahead of the vehicle, the operator being allowed to gain a clear view of the road, by the fact that the screen 15 is not pulled entirely down but suitable space is left between its lower end and the top of the dash-board.

From the foregoing description, taken in connection with the accompanying drawings, it will be seen that we have produced an extremely simple device of the character described yet one which will not only guard the eyes of the operator against rays of light, directly ahead of the machine, but against rays radiating from points to one side thereof.

Having thus described our invention, what we claim as new and desire to secure by Letters Patent is:

1. The combination with the upper transverse bar of a wind shield, of a pair of horizontal plates overlying said bar and having transverse attaching flanges embracing the opposite sides of said bar, an arm pivoted to one of said plates, a slotted tube having one of its ends rigidly secured to said arm, a second arm rigidly secured to and projecting laterally from the opposite end of said tube, a slotted link pivoted to said second arm and overlying the other plate, a set screw passing through the slot in said link and into said plate, a roller in the tube, and a screen carried by said roller and projecting through the slot in said tube.

2. In a device of the class described, the combination with a transverse horizontal support, of a tube having one end closed, its other end being threaded, a cap closing said threaded end and having threads interengaging the threads thereon, a rigid arm projecting laterally from said cap and lying in a horizontal plane, a second horizontal rigid arm projecting laterally from the closed end of the tube, a pivotal connection between the first mentioned arm and the support, a link pivoted to said second arm, means on the support to slidably and removably receive said link, a roller in the tube, and a screen wound around said roller.

3. The combination with a support, of a slotted tube spaced therefrom and having one closed end and one open threaded end, a cap closing said threaded end and having screw threads interengaging the threads thereon, a rigid arm projecting laterally from the closed end of the tube, an additional rigid arm projecting laterally from the cap, a pivotal connection between one arm and the support, means adjustably connecting the other arm with said support, a roller revolubly mounted in the tube, and a screen wound upon said roller and extending therefrom through the slot in the tube.

In testimony whereof we have hereunto set our hands in presence of two subscribing witnesses.

PETER DE BROWN.
HENRY A. SCHULTZ.

Witnesses:
S. G. HOUGHTON,
FRANCES BLACK.